US008483549B2

(12) United States Patent
Steinberg et al.

(10) Patent No.: US 8,483,549 B2
(45) Date of Patent: Jul. 9, 2013

(54) SYSTEM AND METHOD FOR MANAGING THE VISUAL EFFECTS INSERTION IN A VIDEO STREAM

(75) Inventors: Alexander Steinberg, Raanana (IL); Avi Sharir, Ramat Hasharon (IL); Ofir Benovici, Givataim (IL); Guillaume Godet, Bourg la Reine (FR); Zinovy Livshits, Muncie, IN (US); Andrzej Wojdala, Szczecin (PL)

(73) Assignee: Orad Hi-Tec Systems Ltd., Kefar-Saba (IL)

( * ) Notice: Subject to any disclaimer, the term of this patent is extended or adjusted under 35 U.S.C. 154(b) by 1170 days.

(21) Appl. No.: 12/064,149
(22) PCT Filed: Aug. 17, 2006
(86) PCT No.: PCT/IL2006/000961
§ 371 (c)(1),
(2), (4) Date: Feb. 19, 2008
(87) PCT Pub. No.: WO2007/020646
PCT Pub. Date: Feb. 22, 2007

(65) Prior Publication Data
US 2008/0226253 A1 Sep. 18, 2008

(30) Foreign Application Priority Data
Aug. 17, 2005 (IL) .......................................... 170320

(51) Int. Cl.
*H04N 5/93* (2006.01)
(52) U.S. Cl.
USPC ........................................ 386/280; 386/278
(58) Field of Classification Search
USPC .................................................. 386/280, 242
See application file for complete search history.

(56) References Cited

U.S. PATENT DOCUMENTS
5,264,933 A 11/1993 Rosser et al.
5,353,392 A 10/1994 Luquet et al.
(Continued)

FOREIGN PATENT DOCUMENTS
JP 10111956 A 4/1998
JP 2003506820 A 2/2003
(Continued)

OTHER PUBLICATIONS
Automated matchmoving software product, Realviz MatchMover, RealViz, S.A.
(Continued)

*Primary Examiner* — Jung Kim
*Assistant Examiner* — Thomas Ho
(74) *Attorney, Agent, or Firm* — Browdy and Neimark, PLLC

(57) ABSTRACT

A method and system are presented for use in real-time insertion of visual effects in a video stream. At least one reference image is used that contains a region of interest, which is to be involved in the video stream. the reference image is processed by defining a set of at least a few reference features therein, and inserting the visual effects into the reference image with a desired orientation of the visual effects with respect to the region of interest in the reference image. Successive video frames are grabbed in a sequence of a few video frames, and at least one of video frames is used as at least one snapshot image. The snapshot image(s) is/are process by selecting therein at least two from the reference features and determining a reference transformation between the snapshot image and the reference image. Independently of this processing of the snapshot image, the snapshot image and other video frames are processed to determine a sequence of transformations between them. These data are utilized to determine an operative transformation between the reference image and either one of the video frames, thereby enabling real-time management of the appearance of the visual effects in the video stream by using the operative transformation for the insertion of the visual effects in other video frames.

20 Claims, 9 Drawing Sheets

U.S. PATENT DOCUMENTS

| | | | |
|---|---|---|---|
| 5,436,672 A | | 7/1995 | Medioni et al. |
| 5,473,379 A | * | 12/1995 | Horne .................. 375/240.16 |
| 5,491,517 A | | 2/1996 | Kreitman et al. |
| 5,515,485 A | | 5/1996 | Luquet et al. |
| 5,566,251 A | | 10/1996 | Hanna et al. |
| 5,731,846 A | | 3/1998 | Kreitman et al. |
| 5,778,098 A | * | 7/1998 | Lee et al. .................. 382/236 |
| 5,808,695 A | | 9/1998 | Rosser et al. |
| 5,892,554 A | | 4/1999 | DiCicco et al. |
| 6,008,852 A | * | 12/1999 | Nakaya .................. 375/240.16 |
| 6,037,988 A | * | 3/2000 | Gu et al. .................. 375/240.16 |
| 6,077,226 A | * | 6/2000 | Washburn et al. ............ 600/443 |
| 6,100,925 A | | 8/2000 | Rosser et al. |
| 6,141,060 A | | 10/2000 | Honey et al. |
| 6,181,345 B1 | * | 1/2001 | Richard .................. 345/419 |
| 6,229,550 B1 | * | 5/2001 | Gloudemans et al. ........ 345/641 |
| 6,545,724 B1 | * | 4/2003 | Gryskiewicz ................ 348/597 |
| 6,573,945 B1 | * | 6/2003 | Wu et al. .................. 348/584 |
| 6,636,222 B1 | * | 10/2003 | Valmiki et al. ............... 345/505 |
| 6,667,094 B1 | | 12/2003 | Beck et al. |
| 6,707,854 B1 | * | 3/2004 | Bonnet et al. ............. 375/240.16 |
| 6,765,569 B2 | | 7/2004 | Neumann et al. |
| 7,020,381 B1 | * | 3/2006 | Kato et al. .................. 386/280 |
| 7,184,100 B1 | * | 2/2007 | Wilf et al. .................. 348/700 |
| 7,215,872 B2 | * | 5/2007 | Akiyoshi et al. ............. 386/279 |
| 7,227,896 B2 | * | 6/2007 | Sun .......................... 375/240.16 |
| 7,302,113 B2 | * | 11/2007 | Pilu et al. .................. 382/276 |
| 7,360,230 B1 | * | 4/2008 | Paz et al. .................. 725/47 |
| 2001/0005218 A1 | * | 6/2001 | Gloudemans et al. ........ 348/157 |

FOREIGN PATENT DOCUMENTS

| | | |
|---|---|---|
| JP | 2003196663 A | 7/2003 |
| JP | 2004208083 A | 7/2004 |
| JP | 2004297675 A | 10/2004 |

OTHER PUBLICATIONS

Automated matchmoving software product, Boujou4, 2d3 Limited, 21-01.

Y. Wang, et al.; "Viedo Processing and Communications", Prentice Hall, 2001, pp. 141-216.

Automated matchmoving software product, Realviz MatchMover, RealViz, S.A., Apr. 3, 2008.

Automated matchmoving software product, Boujou4, 2d3 Limited, 21-01, dated at least as early as May 2007.

Farin, et al.,"Robust camera calibration for sport videos using court models," SPIE-IS&T, 2004, pp. 80-91, vol. 5307.

* cited by examiner

SYSTEM AND METHOD FOR MANAGING THE VISUAL EFFECTS INSERTION IN A VIDEO STREAM

FIELD OF THE INVENTION

This invention is generally in the field of machine vision and relates to a system and method for insertion of visual effects in a video stream, particularly useful for cinema and broadcast.

BACKGROUND OF THE INVENTION

There are several common procedures typically used in the creation of visual effects for cinema and broadcast. These include "matchmoving", the term that refers to the process of matching the position and angle of a visual effect (e.g., object) to be inserted in a live-action footage and the live-action footage itself. Examples of visual effects include computer generated imagery (e.g. animated creature), a soccer off-side line, distance between elements on field, highlight on various elements in video, an advertisement logo, graphic sequences build from still frames, 3D objects rendering, insertion of external video source as visual effects, and any other object insertion and/or modification.

Live-action footage can be shot with a film, video or television camera. The matchmoving procedure is a required step for creating a plausible looking visual effect. Applications utilizing the matchmoving include altering the appearance of some objects intended for advertising some brand or company, in a movie, which is carried out in accordance with a geographical location of the movie audience. Also matchmoving is used for adding auxiliary lines or symbols to sport broadcasts, such as lane numbers looking as if they were under the water in swimming competitions, or off-side lines in soccer games. Yet other matchmoving-based applications use the addition of animated characters to a movie or, vice versa, addition of real actors to computer generated scenes, etc.

In matchmoving applications, there are generally two main approaches to getting information about the shooting camera parameters, necessary for an accurate adjustment of the graphical objects to the video stream. The first approach is based on the use of sensing systems, targeted to provide the camera parameters through physical measurements. The sensor-based systems are characterized by their universality, meaning these systems can be used independently, irrespective of the content of the video stream. On the other hand, they suffer from typical limitations of measuring systems, such as insufficient sensing accuracy (especially for outdoor conditions), time-consuming calibration procedures, and high cost.

The second approach widely exploits computer vision techniques, according to which required information about the camera parameters is extracted directly from the video stream. This class of methods has been intensively investigated in the past 15 years.

The procedure of extraction of information about the camera parameters (e.g., position and orientation in three dimensions, focus, zoom, distortion) from a footage is known as camera calibration for a fixed camera or camera tracking for a moving camera. The determination of the camera parameters may be facilitated in the presence of a camera sensing system in case of combination of the two aforementioned general approaches. Camera tracking is used in the U.S. Pat. Nos. 6,100,925 and 5,436,672 as well as in the automated matchmoving software products Realviz MatchMover and Boujou, commercially available respectively from RealViz S. A. and 2d3 Limited. However, this procedure is fairly complex due to the necessity to determine three-dimensional (3D) parameters from two-dimensional (2D) frames. The major difficulties in the camera tracking techniques are associated with the necessity to predefine a set of calibration features and their geometrical relationship; the necessity to satisfy time constraints, especially stringent for live broadcasts; the potential loss of the tracked calibration features due to rapid motions, camera occlusions, or poor imaging conditions. When using a sensing system, targeted to provide the camera parameters through a physical measurement, the difficulties are associated with insufficient accuracy of sensing, as well as increased product price and the need for additional equipment.

Another approach utilizes the so-called scene motion (global motion) tracking technique, which is advantageous over camera tracking in that it is capable of evaluating direct frame-to-frame (field-to-field) geometric transformations by image processing algorithms. Examples of scene motion tracking methods include block matching, optical flow, and other techniques known in the art [Y. Wang, J. Ostermann, Y. Zhang, "Video processing and communications", Prentice Hall, 2001, pp. 141-216; and U.S. Pat. No. 5,808,695]. Most known techniques of this type utilize a selected set of reference points/features to find transformations between the successively grabbed frames.

Examples of the above methods can be found in the following U.S. Pat. Nos. 5,264,933; 5,353,392; 5,515,485; 5,731,846; 5,892,554; 5,491,517; 5,436,672; 6,100,925; 6,181,345; 6,765,569.

SUMMARY OF THE INVENTION

There is a need in the art for facilitating broadcasting (real time or post production, such as TV or cinema), by providing a novel system and method enabling fast, effective and seamless insertion of visual effects (e.g., graphics) in a video stream.

The main idea of the present invention consists of using operator's prompts to initialize visual effects insertion and exploiting global motion estimation techniques for tracking appropriate graphics along the time.

This is associated with the following: A key step of most of known algorithms is solving some pattern-recognition (PR) problem, namely, defining a certain pattern and finding it in a video image. The only requirement to be satisfied by the predefined pattern is that the knowledge of the pattern position on the video image would provide all the information for the matchmoving operation on that image. Typical examples of such patterns include a central circle line and lines marking goal areas for soccer, court lines for the tennis field, etc. However, such pure-PR strategies (i.e., algorithms based only on searching for patterns) often result in poor performance of the system: reliable and stable recognition for all the video frames is difficult to provide within a significant time. For example, during sport events broadcasting, such factors as rapid camera motions, lighting conditions, etc. sharply reduce the efficiency of pure-PR strategies. For this reason, matchmoving applications can utilize a combination of the PR-based methods and so-called "global motion estimation" techniques. The latter, which have been intensively developed in the scope of video coding applications, utilize huge amounts of information to calculate a relationship between highly correlated images (in particular, between the successive video frames). Such combined techniques allow for exploiting a PR solution for some "good" picture as a start point for matchmoving, and then for tracking this solution along the time using the independently calculated estimates of global motion. However, this very general and powerful approach cannot provide a matchmoving solution if it is applied to a situation where no geometrical object, which can be used as a predefined pattern, can be found in an area of interest. For example, in the system aimed to show a TV audience a virtual offside line, such an offside scene can be located between the central circle and the goal area, so a series of video images may not contain enough information for accurate automated pattern recognition.

The present invention solves the above problems by providing a novel technique utilizing the operator's input to initialize visual effects insertion and carrying out global motion estimation techniques for tracking appropriate graphics along the time. According to the invention, this is implemented by utilizing one or more reference images of a region of interest (which is to be involved in the video stream) and one or more snapshot images being that/those of the grabbed frames of the video stream. The reference image is used to insert therein certain visual effects with a desired orientation thereof with respect to the region of interest. These images (reference and snapshot) are used to find a transformation between them, based on reference features. More specifically, a certain number of reference features is selected and marked in the reference image, and at least some of them are then found and marked in the snapshot image(s). Independent of this procedure (while being carried out concurrently or not), transformations between the snapshot image(s) and other video frames (started from the snapshot and proceeded with respect to downstream and/or upstream frames of the snapshot one) are determined by any known image processing technique, while not requiring the search for the predefined reference features. This technique provides for fast, effective and seamless insertion of visual effects in a video stream.

The term "region of interest" used herein signifies a region where the desired visual effects are to be presented. It should be understood that the region of interest may be only a part of the video stream scene.

It should be noted that a reference image as well as a snapshot image actually present a grabbed video frame or field. The term "image" is used herein in association with reference and snapshot frames solely for the purposes of simplifying the description of the invention to distinguish between the reference and snapshot frames/fields from other termed here "video frames". This is because according to the invention reference features are applied only to the reference and snapshot frames, while need not to be used in association with any other grabbed frames.

According to one broad aspect of the invention, there is provided a method for use in real-time insertion of visual effects in a video stream, the method comprising:

i. processing at least one reference image that contains a region of interest, which is to be involved in the video stream, said processing comprising defining a set of at least a few reference features in said at least one reference image, and inserting the visual effects into said at least one reference image with a desired orientation of said visual effects with respect to the region of interest in said reference image;
 ii. grabbing successive video frames in a sequence of a few video frames from said video stream, and selecting at least one of said video frames to be used as at least one snapshot image;
 iii. processing said one or more snapshot images by selecting therein at least two features from said at least few reference features and determining a reference transformation between the snapshot image and the reference image; and independent of said processing of the snapshot image, applying processing to the snapshot image and to other of said sequence of the video frames to determine a sequence of transformations between them,
 iv. utilizing said determined sequence of transformations and said determined reference transformation to determine an operative transformation between the reference image and either one of said few video frames in the sequence, thereby enabling real-time management of the appearance of the visual effects in the video stream by using said operative transformation for the insertion of the visual effects in other video frames.

Preferably, the video frames are grabbed using an imager configured for rotation while at a fixed position thereof with respect to the region of interest. Alternatively or additionally, the technique is applicable to a substantially planar region of interest.

Preferably, the determination of the sequence of transformations between at least some of the video frames includes applying image processing based on pattern recognition to the video frames. The pattern recognition preferably utilizes estimation of a motion of background windows at a video rate (the so-called "windows technique").

Preferably, the processing of the snapshot image(s) includes selecting and marking of only two of the reference features in the snapshot image(s). In this connection, it should be noted that the case may be such that the total number of reference features to be marked in the snapshot are located in more than one snapshot images. For example, two snapshot images are selected, each including a different reference feature. By determining a transformation between these two snapshot images, both reference points could be found in one of these snapshot images. Also, preferably, the set of reference features includes at least four reference features. It should, however, be understood that the invention is neither limited to the use of four reference points in the reference image nor to the use of two reference points in the snapshot image(s). Generally, at least two reference points are selected in the reference image to enable selection of two reference points in the snapshot image(s); and more than two reference points may be marked in the snapshot image(s), provided a corresponding number of reference points have been defined in the reference image.

It should also be noted that a correspondence between the selected reference points in the snapshot and those of the reference image may or may not need to be determined.

In some applications of the invention, the method also includes selecting, in at least some of the video frames, at least one moving object within the region of interest. The current position of this at least one moving object determines the appearance of the visual effects in the respective video frame.

Preferably, the method of the present invention is managed by an operator (manual mode). More specifically, the operator selects and marks the set of the reference features in the reference image, and selects and marks the at least two reference features in the snapshot image.

The method of the invention is particularly useful for insertion of the visual effects during real-time soccer game broadcasting, and/or for the insertion of logos or animated advertisements, and/or for visual effects in any other sport broadcasts, but generally can be used for any type of broadcasting (real-time or post production).

According to another broad aspect of the present invention, there is provided a method for use in real-time insertion of visual effects in a video stream, the method comprising:

i. processing at least one reference image that contains a region of interest, which is to be involved in the video stream, said processing comprising defining a set of at least a few reference features in said at least one reference image, and inserting the visual effects into said at least one reference image with a desired orientation of said visual effects with respect to the region of interest in said reference image;

ii. grabbing a sequence of a few video frames from said video stream acquired by an imager, and selecting at least one of said video frames to be used as at least one snapshot image;

iii. processing said one or more snapshot images by selecting therein at least two features from said at least a few reference features, and determining a reference transformation between the snapshot image and the reference image; and independent of said processing of the snapshot image, applying processing to the snapshot image and to the other of said sequence of the video frames to determine a sequence of transformations between them, iv. utilizing said determined sequence of transformations and said determined reference transformation to determine an operative transformation between the reference image and either one of said few video frames in the sequence, the method thereby enabling real-time management of the appearance of the visual effects in the video stream.

According to yet another broad aspect of the present invention, there is provided a system for use in real-time insertion of visual effects in a video stream, the system comprising:

(a) a frame grabber utility configured for receiving data indicative of the video stream;

(b) a manager utility connectable to the frame grabber and configured and operable to allow an operator to carry out the following: process a reference image that contains a region of interest, which is to be involved in the video stream, by defining a set of at least a few reference features in said at least one reference image and inserting the visual effects into said at least one reference image with a desired orientation of said visual effects with respect to the region of interest in said reference image; and select at least one video frame to be used as at least one snapshot image and process said one or more snapshot images by selecting therein at least two features from said at least few reference features;

(c) a processor utility configured and operative to be responsive to data indicative of successive video frames of said video stream, data indicative of the reference image with said few reference features therein, and data indicative of said one or more snapshot images and said at least two reference features therein; said processor utility being configured for independently carrying out a first processing of said data indicative of the video frames sequence and determining a sequence of transformations between at least some of said video frames including that of the one or more snapshot images, and a second processing of said data indicative of the reference and snapshot images and determining a reference transformation between the snapshot image and the reference image; and being configured for analyzing the determined transformations to determine an operative transformation between the reference image and either one of said video frames, and use this operative transformation for real-time management of the appearance of the visual effects in the video stream.

BRIEF DESCRIPTION OF THE DRAWINGS

In order to understand the invention and to see how it may be carried out in practice, preferred embodiments will now be described, by way of non-limiting example only, with reference to the accompanying drawings, in which.

DETAILED DESCRIPTION OF EXEMPLARY EMBODIMENTS

Figure 1:
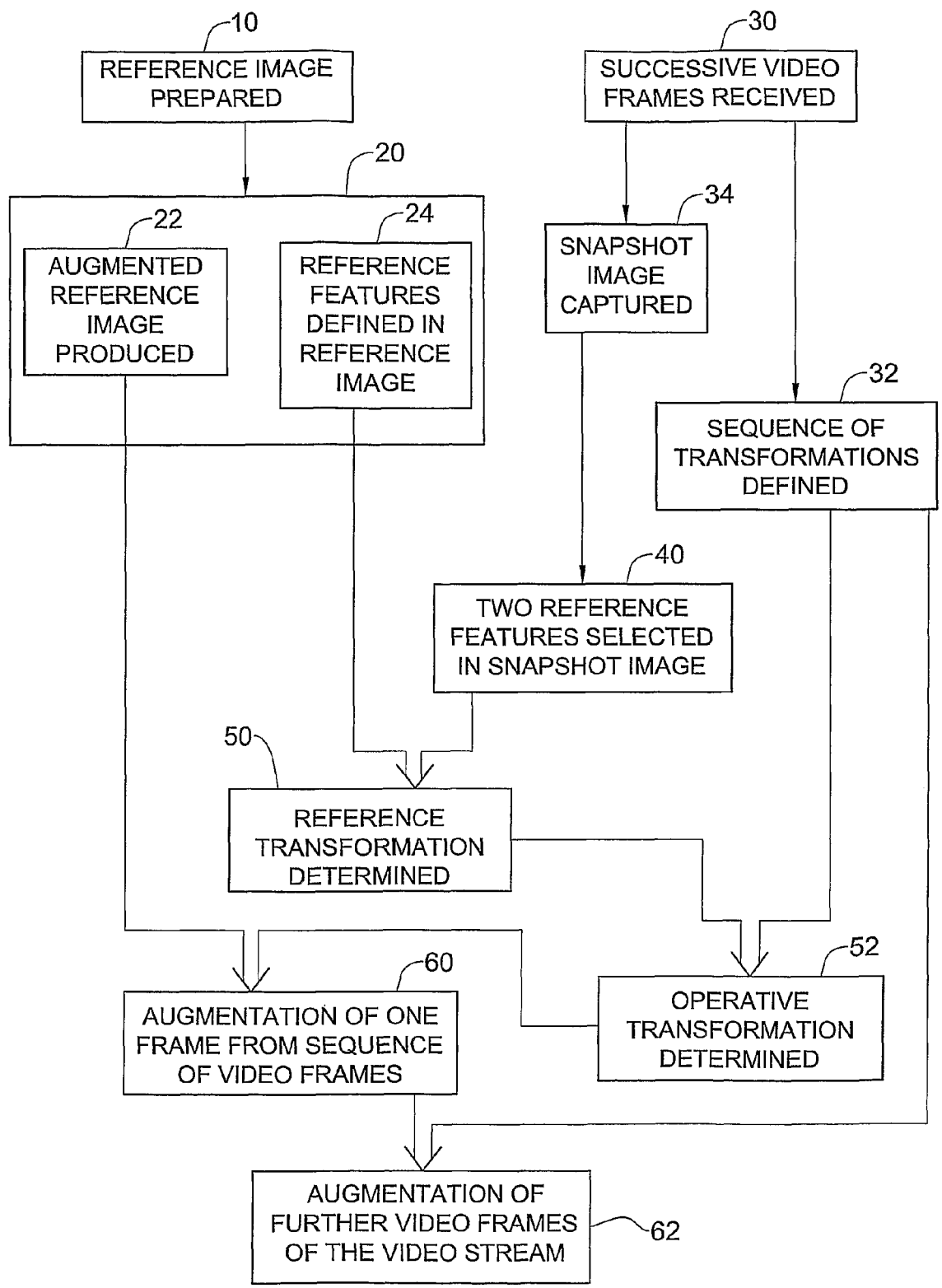
FIG. 1 is a schematic illustration of an example of a method of the invention for managing the insertion of visual effects in a video stream.

Referring to FIG. 1 there is illustrated, by way of a flow diagram, an example of a method of the invention for use in insertion of visual effects in a video stream, particularly for use in real-time broadcasting.

According to the invention, one or more reference images of a region of interest are provided (step 10). The region of interest is that to be involved in the video stream, and may be part of a stadium, a tennis court, a film studio, etc.

The reference image is displayed to an operator, who applies certain processing thereto (step 20). The processing includes the following: The operator defines a set of at least a few reference features in the reference image (step 22). Generally, the use of only two reference features in the reference image might be sufficient for the technique of the invention, but preferably at least four such reference features are used. This is because further processing of a snapshot image requires selection of at least two from these reference features in the snapshot image (as will be described further below).

As mentioned above, reference and snapshot images are grabbed video frames or fields, and the term "image" is used in association with reference and snapshot frames for the purposes of distinguishing between the reference/snapshot frame and other "video frames".

The reference features can be natural landmarks, or can be objects brought to the region of interest intentionally. For example, in a soccer game the reference features may include the intersections of lines marking different zones of a scene. Prior to or after the selection of the reference features in the reference image, the operator inserts certain visual effects into the reference image with a desired orientation of these effects (i.e., relative accommodation) with respect to the region of interest (step 24). An image (frame, field) with the inserted visual effects is termed "augmented image" or "augmented frame".

Concurrently or not concurrent with the processing of the reference image, a system (the construction and operation of which will be described further below) operates to grab successive video frames of the scene (step 30). These video frames are processed to determine a sequence of transformations between at least some of them (step 32). One (or more) of these video frames is selected (by an operator) to be used as snapshot image(s)—step 34. The snapshot image is one of said sequentially grabbed video frames selected such that it is connected to at least some other of said video frames by the determined transformation sequence.

One or more snapshot frames is/are displayed for the operator, who selects therein at least two reference features from the reference features' set defined for the reference image(s)—step 40. Then, the reference and snapshot images (with the marked reference features therein) are processed to determine a reference transformation between the snapshot image and the reference image (step 50).

It should be noted, although not specifically shown in the flow chart of FIG. 1, that if no two common reference features can be found in the selected snapshot and reference images, then at least one of the following is carried out: another snapshot image is captured, another reference image (from the previously prepared ones with their corresponding augmented images) is used, and another reference features' set or additional reference features are selected. Also, the case may be such that (although least preferable) a new reference image needs to be prepared and processed (i.e., reference features are selected and augmented reference image is prepared). Considering that the preparation of an augmented reference image is time-consuming and thus is to be avoided especially in real-time broadcasting, it would be preferable to prepare a full set of reference/augmented images off-line (at steps 10 and 20).

Then, the transformation sequence (determined in step 32) and the reference transformation (determined in step 50) are analyzed, and an operative transformation is determined (step 52), which is used for inserting visual effects into one of the video frames which is to start the augmentation of the video stream frames (at least a part of the video stream). Augmentation of the video frames is carried out by applying the operative transformation to a part of the augmented reference image containing the visual effects (step 60). Thereafter, a further visual effects' insertion (i.e., augmentation of further video frames of the video stream) is carried out (step 62) based on the transformations sequence (determined in step 32).

In a real-time broadcast, some video frames might already be aired by the time the operator completes the reference features selection (at least two reference features) in the snapshot image. These video frames will thus miss the augmentation process. However, a time consuming operation such as the insertion of visual effects into the reference image(s) can be performed prior to a broadcast. Hence, further video frames could be augmented in real-time and be aired with visual effects inserted therein.

Figure 2:
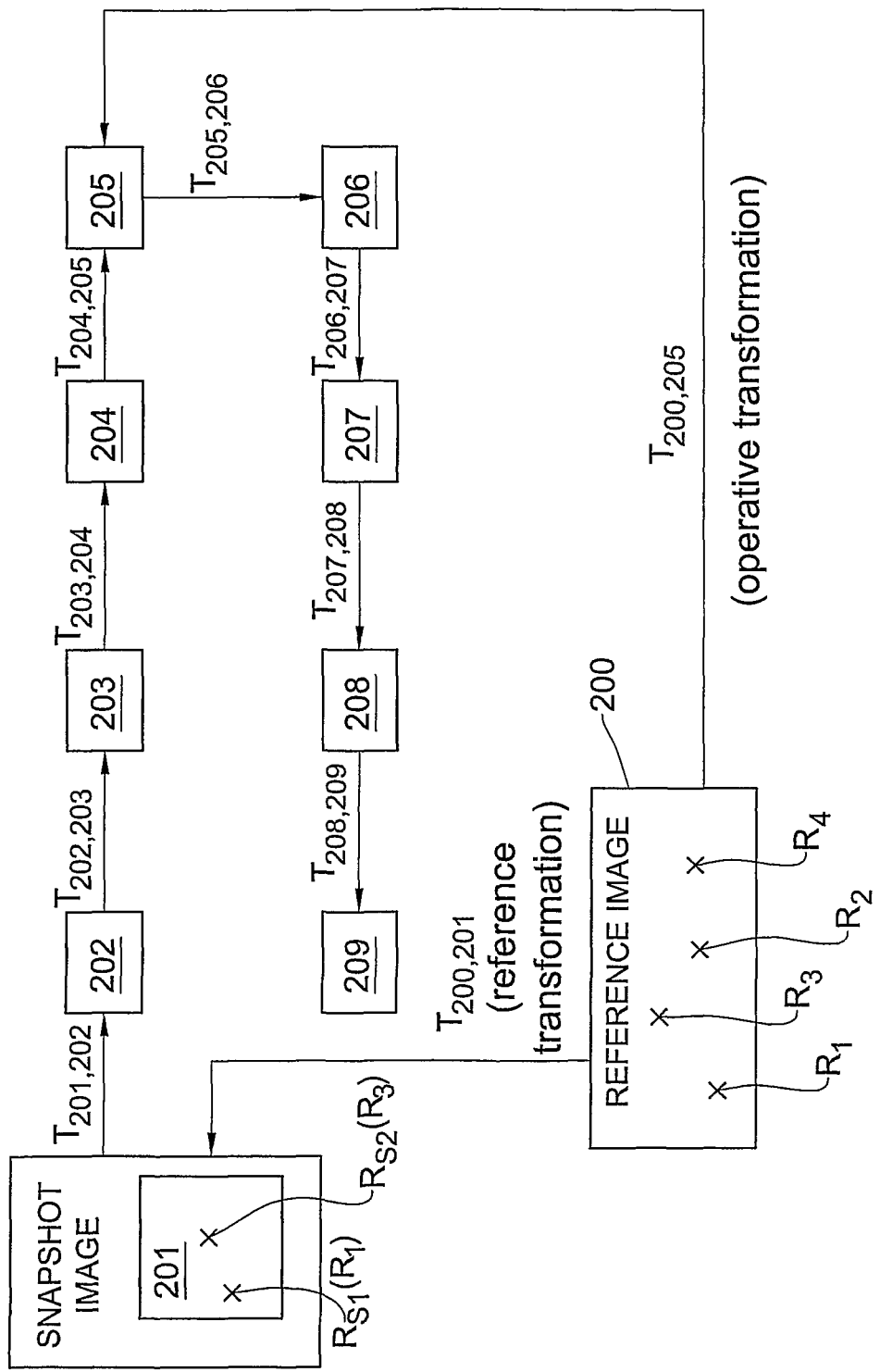
FIG. 2 exemplifies the technique of determination of transformations between various images/frames used in the invention.

Reference is made to FIG. 2 showing a specific, but not limiting example, of the above-described method. A reference image 200 and several successive video frames, nine such frames 201-209 in the present example, are shown. The sequence of transformations between the video frames are represented by arrows $T_{201,202}$, $T_{202,203}$, $T_{203,204}$, $T_{204,205}$, $T_{205,206}$, $T_{206,207}$, $T_{207,208}$, and $T_{208,209}$. Generally, each transformation defines correspondence between the respective pair of video frames of the same scene; this is a projection function of each point from one frame into the other.

The transformations between the video frames can be established by various global motion estimation methods, based for example on the block matching, optical flow, etc. techniques (see for example Y. Wang et al. "Video Processing and Communications", Prentice Hall, 2001, pp. 141-216). The invention utilizes scene motion tracking, and may or may not utilize camera tracking (determination of camera movement parameters), for transformation determination.

The invention advantageously does not involve computation of a camera position from 2D images of the video stream and does not utilize tracking of specific reference features throughout the sequence of video frames. Therefore it allows for establishing a transformation connecting two video frames of different fields of view, provided there is a third video frame having some common features with the first frame and some common features with the second frame (the latter common features may be the same or different from the former common features). It should be understood that the term "field of view" used herein actually refers to the scene part viewed by the camera in its current orientation, and is not meant as the camera parameter.

Returning back to FIG. 2, the transformations shown there can be established by any known suitable method. Generally, desired visual effects can be inserted into any video frame if these effects are inserted in another video frame and a transformation connecting these two video frames is known (has been determined). In order to insert the visual effects into video frame 205 (considering that real-time broadcasting or post production of augmented video stream will start from this frame), the following technique is employed:

The visual effects are inserted into reference image 200, and reference features $R_1$-$R_4$ are marked in the reference image. After the video frame 201 is captured and selected as the snapshot image, a reference transformation $T_{200,201}$ connecting reference and snapshot images 200 and 201 needs to be determined. To this end, reference features $R_{S1}$ and $R_{S2}$ from the reference features $R_1$-$R_4$ are selected in the snapshot image. At the time of selection, the correspondence between reference features $R_{S1}$ and $R_{S2}$ and the reference features $R_1$-$R_4$ may be specified (e.g. an operator or a pattern recognition technique determines that $R_{S1}$ and $R_{S2}$ in the snapshot image respectively correspond to $R_1$ and $R_3$ in the reference image) or may be left without specification.

With the correspondence for a pair of reference features' established, the reference transformation $T_{200,201}$ can be determined under assumption that the camera movement between the reference and the snapshot frames is limited to four degrees of freedom (e.g. tilt, pan, zoom, and roll, while a change in location is negligible). If correspondence between the reference features is not specified, while the selection of proper reference features (two or more such features) $R_{S1}$ and $R_{S2}$ is made, the reference transformation $T_{200,201}$ can be determined under assumption that the camera movement between the reference and the snapshot frames is limited to three degrees of freedom (e.g. tilt, pan, and zoom).

The above technique, requiring two reference features under assumption of a number of camera's degrees of freedom limited by three or four, can be used in a vast number of applications. In situations, where the number of camera's degrees of freedom exceeds four degrees, more than two common reference features will be specified in the reference and the snapshot images.

A sequence of transformations $T_{201,202}$, $T_{202,203}$, $T_{203,204}$, $T_{204,205}$ is successively determined, where frame 201 is the snapshot one. Then, this sequence of transformations, and the reference transformation $T_{200,201}$, are utilized to determine an operative transformation $T_{200,205}$. This operative transformation is then used to insert the visual effects in video frame 205; transformation $T_{205,206}$ is used to insert the visual effects in video frame 206; transformation $T_{206,207}$ is used to insert the visual effects in video frame 207; and so on.

Thus, the insertion of visual effects into a sequence of video frames, connected in between by an appropriate sequence of transformations, can be performed through insertion of the visual effects into the reference image, determining the operative transformation, using it to insert the visual effects in a certain video frame (e.g., snapshot image), and then applying the transformations sequence to successive frames downstream (for broadcasting) and/or upstream (for post production) of said certain frame.

Thus, the present invention provides a novel effective technique for insertion of visual effects in a video stream. This technique advantageously allows for using a few reference features only, and does not need any tracking of the reference features throughout the video frames.

Referring to FIGS. 3A-3E, there is illustrated an example of the present invention for use in the real-time broadcast of a game (e.g., sports game such as soccer) or other event type, where the insertion of visual effects is dependent or associated with the moving objects (players). FIGS. 3A-3E show several screens used by an operator while managing the broadcast. These figures demonstrate the use of a shadowed off-side zone (in the broadcast of a soccer game) as a visual effect. Each screen has inter alia two windows $W_1$ and $W_2$, upper window $W_1$ being used for displaying a video stream, and lower window $W_2$ being used for displaying a grabbed frame (reference or snapshot image) to be processed by the operator. It should be noted, although not shown in the present example, that an additional window may be used so as to enable display of both the reference or snapshot images.

Figure 3A:
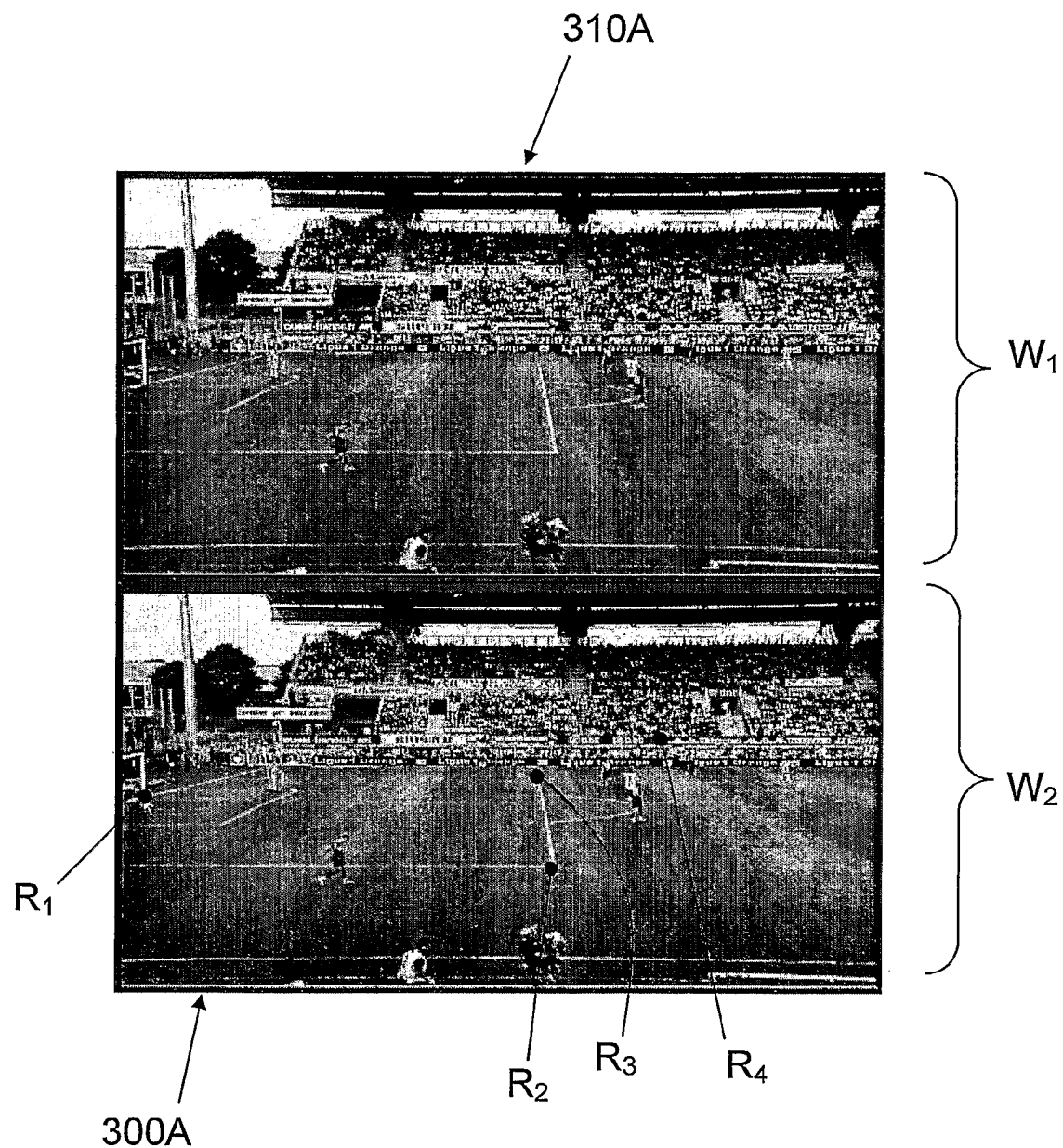
FIGS. 3A to 3E show a specific example of the invention used for management of the visual effects appearance in the real-time broadcast of a soccer game (constituting an event type, where the insertion of visual effects is dependent or associated with the moving objects (players))
Figure 3B:
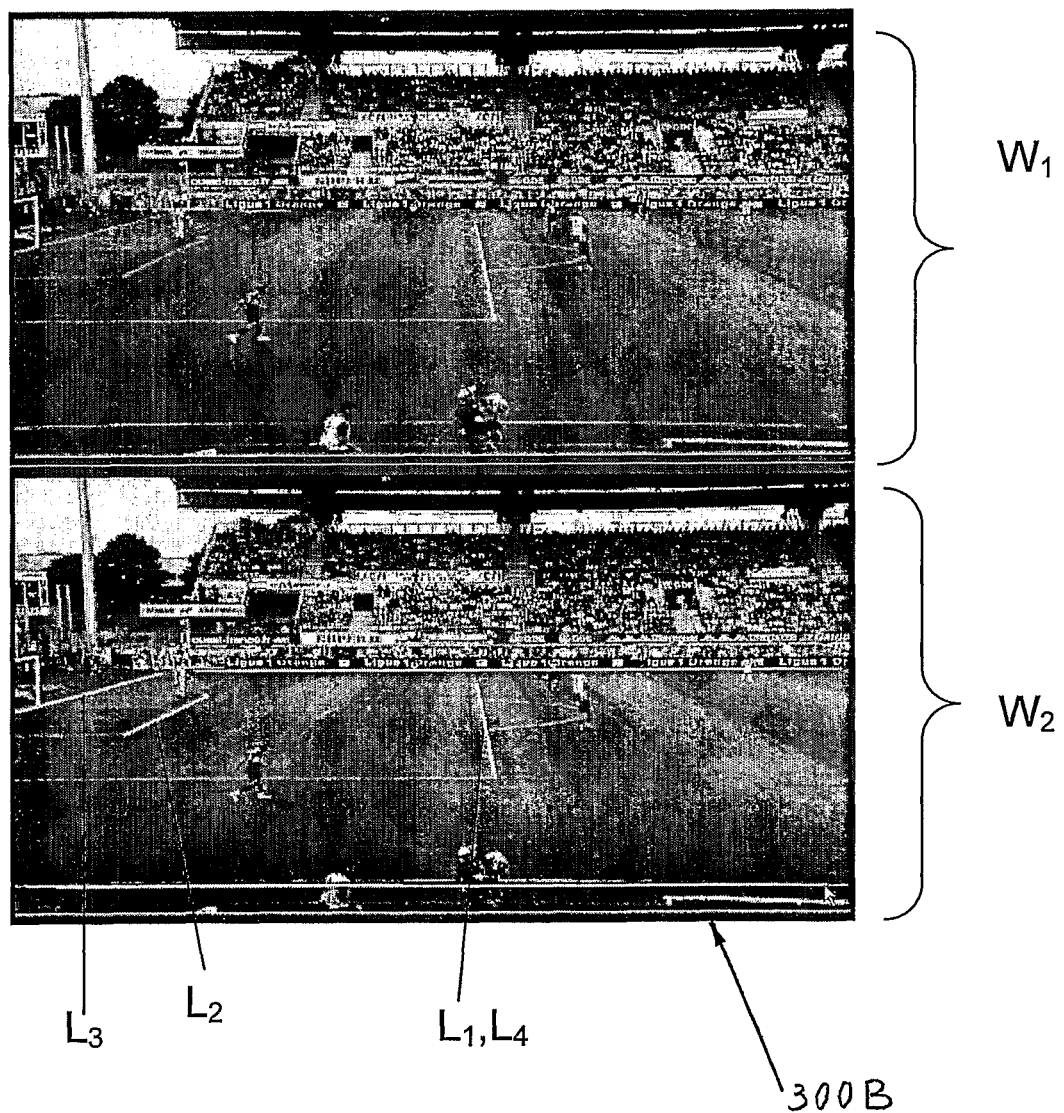

In FIG. 3A, a reference image 300A is prepared, by being grabbed from video stream 310A displayed in window $W_1$, and is displayed in window $W_2$. As further shown in FIG. 3A, an operator applies processing to the reference image 300A by marking reference features therein, four such reference features $R_1$-$R_4$ in the present example. As shown in FIG. 3B, in this specific example, the operator then selects a certain number of pitch lines to enable augmentation of the reference image. The selection of a pitch line is done by marking the edges thereof. The technique of the invention provides the off-side area shadowing and utilizes calculation of the locations of all needed pitch lines (i.e., touchlines and goal lines) based on the operator's selection of the pitch lines. In the current example, the pitch lines selected by the operator include three lines: a front penalty area line $L_1$, a front goal area line $L_2$, and a goal line $L_3$.

The off-side zone (to be shadowed) is typically defined as a rectangle between the touchlines, the goal line, and a relevant player. At the initial stage, consisting of predicting the visual effects appearance (that of the off-side zone) in the video stream, the operator considers the "estimated" off-side line location $L_4$ as coinciding with front penalty area line $L_1$. The actual off-side line cannot be determined at this stage because of the varying position of the relevant player. Hence, a partially augmented reference image 300B includes the off-side line (indicative of the visual effect) in its "estimated" appearance.

Figure 3C:
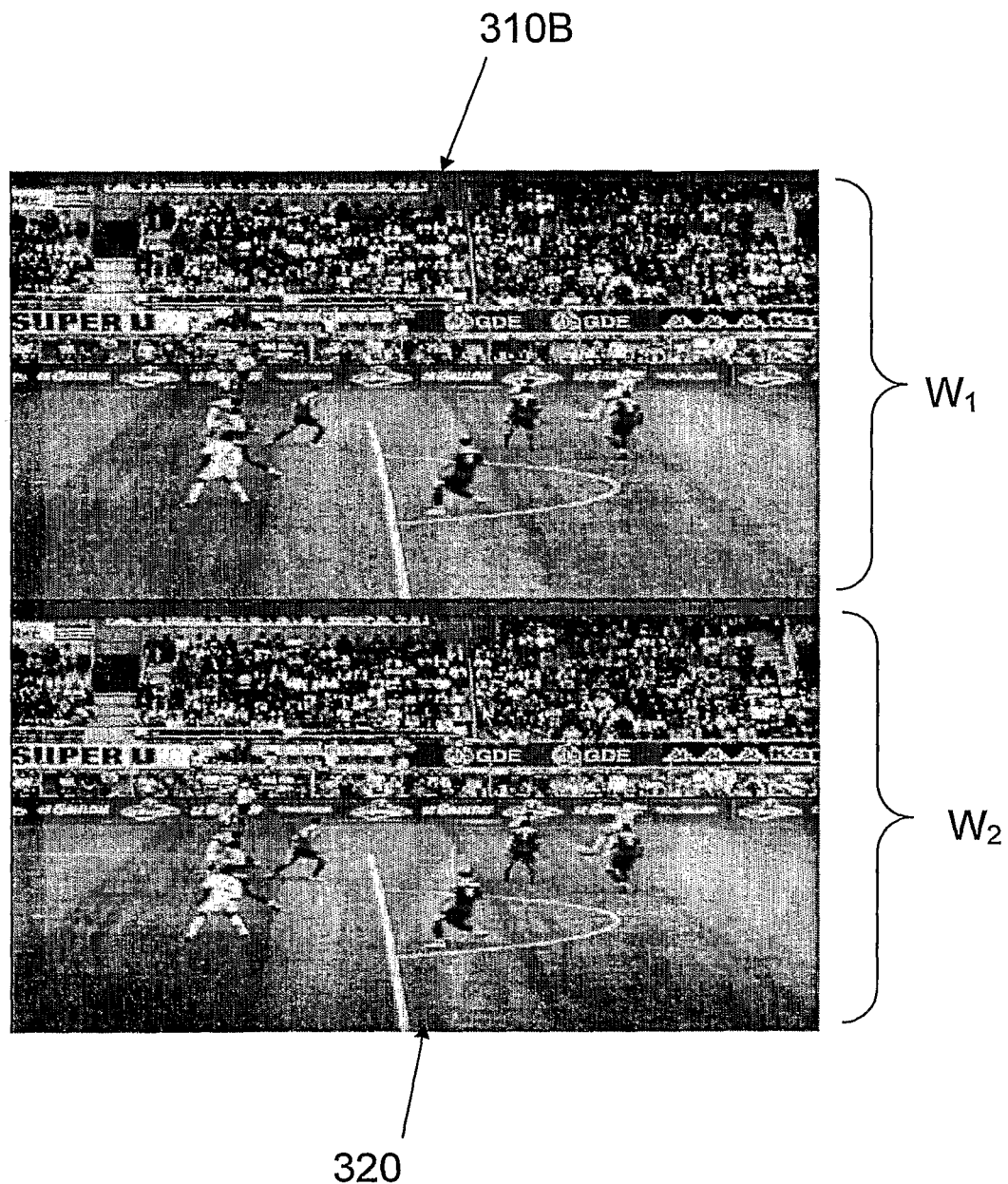

FIG. 3C shows a snapshot image 320 in window $W_2$, the image being one selected from the real-time (during the game) grabbed video stream 310B displayed in window $W_1$.

Figure 3D:
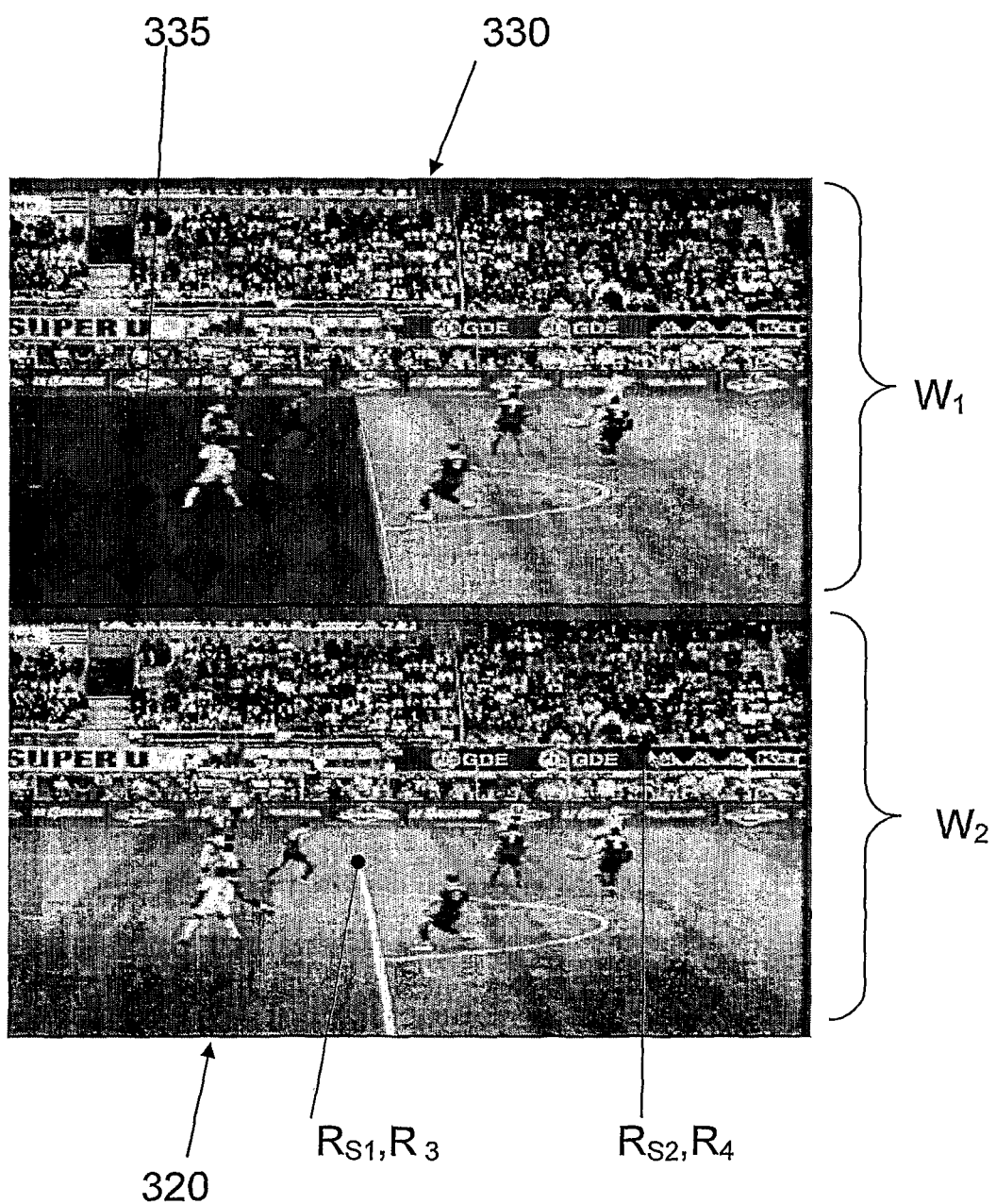

In FIG. 3D, the operator selects two reference features $R_{S1}$ ($R_3$ in reference image) and $R_{S2}$ ($R_4$ in reference image) in the snapshot image (from the set of reference features $R_1$-$R_4$ defined earlier), as shown in window $W_2$. In this specific example, the system operates with three degrees of freedom and therefore there is no need for determining the correspondence of reference features in the reference and snapshot images. Thus, a reference transformation between the snapshot image 320 and the reference image 300A can be established. Also, optionally the operator prepares an augmented snapshot image 330 appearing in window $W_1$. The augmented snapshot image 330 includes an "estimated" shadowed off-side zone 335. It should be understood that actually the preparation of the augmented snapshot image is optional, but might be preferable in this specific example, where actual augmentation of the reference image was not completed.

Figure 3E:
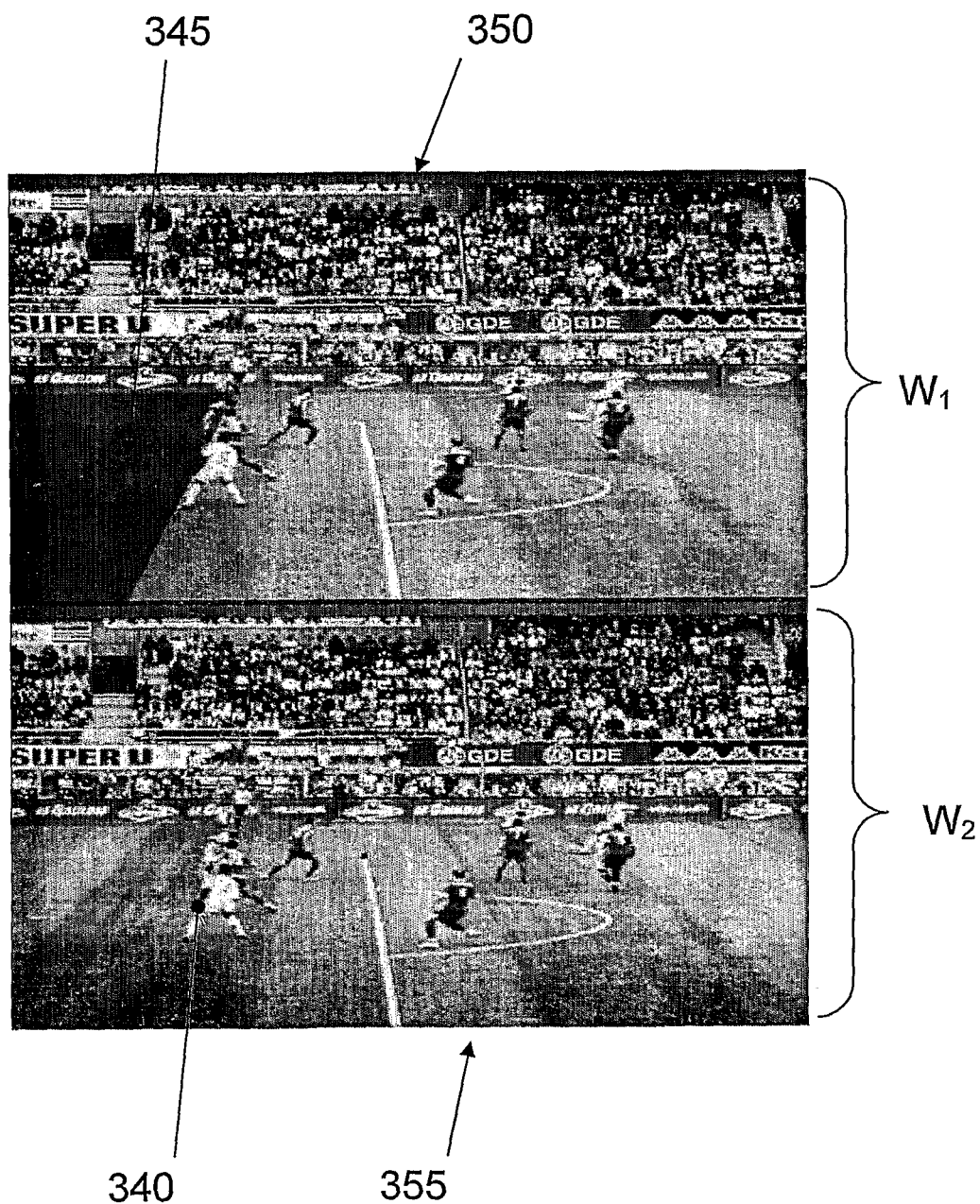

FIG. 3E shows the augmented video frame 350 appearing in window $W_1$ and a video frame 355 in window $W_2$. As shown, the position of a relevant player 340, that determines an off-side line in real-time, is selected (by operator) as a variable feature defining the actual position of the visual effect, i.e., the shadowed off-side zone 345. The latter is then increased/decreased to cover the rectangle of the field limited by the goal line and the off-side line. The video frame with appropriately increased/decreased shadowed off-side zone is thus ready to be aired. Thus, the definition of the visual effect has been carried out in several steps. The only requirement is that the definition of the visual effect must be completed before the time the augmented video frame 335 is put on the air.

The above-described technique for shadowing an off-side zone in a soccer game broadcast is generally similar to the example of the method of the invention previously described, except for the last step, namely the displacement of the off-side line to increase/decrease the shadow of the off-side zone. This is the specific example where the position of the visual effect is determined by a moving object (i.e., by a player). In other words, the shadowed off-side zone is inserted into the video frame(s) with the desired orientation in respect to the region of interest (which is the soccer field with the relevant player). Thus, the shadowed part of a scene is limited by the field touchlines, the goal line, and the off-side line, the off-side line being parallel to the front penalty area line, and being determined by the position of the relevant player at the time of airing the video frame.

Figure 5:
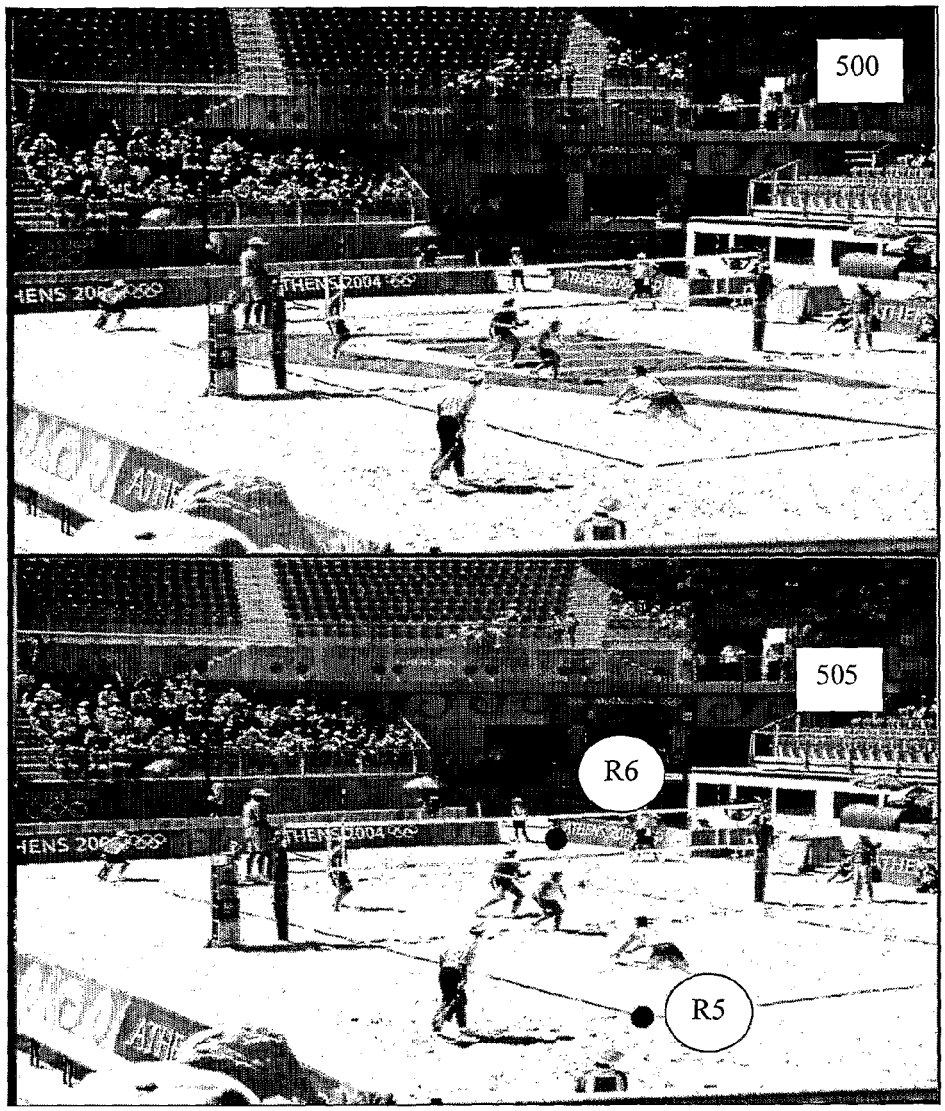
FIG. 5 shows a specific example of the invention used for insertion of visual signage on a beach volleyball surface.

Referring to FIG. 5, there is shown a specific example of the invention used for insertion of visual signage on a beach volleyball surface. As shown in the figure, an augmented video frame 500 appears in a window $W_1$ and a video frame 505—in a window $W_2$, and the operator selects two reference features $R_5$ and $R_6$ from the set of reference features defined earlier, in a similar work-flow to that described in the offside example in FIG. 3A.

In the present example, and usually when used for signage, graphics can appear or fade in immediately after the second reference point is marked, as there is no need for actual positioning of the signage. Signs positioning is determined according to the different sports plains, and according to the lines that are marked for the augmentation of the reference image. The operator places the signs on a predefined location or can select the exact position prior to the broadcast. In this particular example, there is one sign position on a plain surface. Similar to the offside line example, sign can also be positioned or repositioned as a variable feature selected by the operator.

Figure 4:
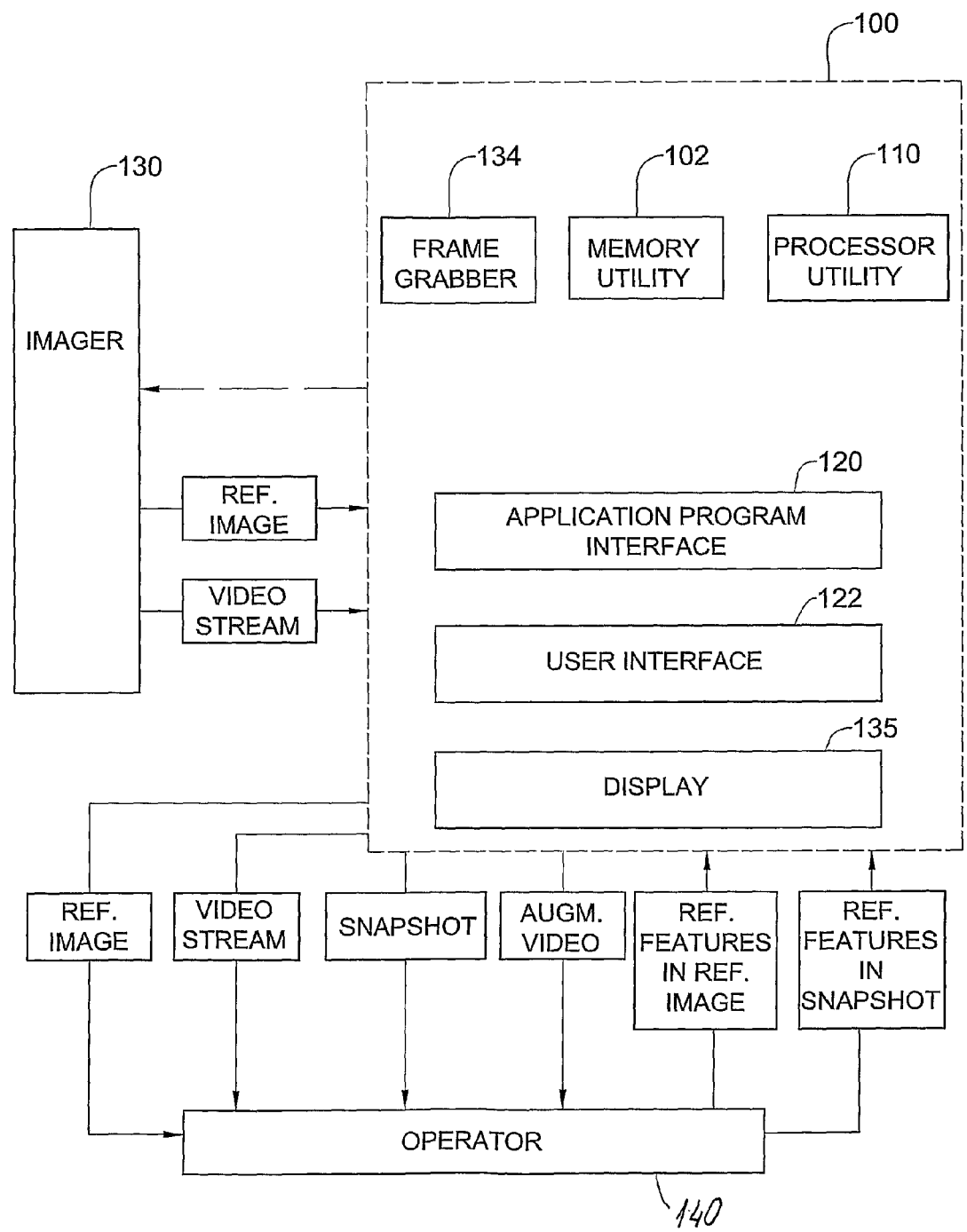
FIG. 4 is a block diagram of a system according to the invention.

Reference is now made to FIG. 4, illustrating, by way of a block diagram, a system 100 of the present invention configured for use in management of visual effects insertion in a video stream. The system 100 is typically a computer system including inter alia a memory utility 102; a processor utility 110; an appropriate user interface utility 122; and data input and output utilities (not shown). System 100 also includes a manager utility 120, which is configured as application program interface (API), namely a software product enabling certain functions of a software model (run by the processor utility) to be available to an operator 140 through the user interface. It should be noted that, preferably, a system operator refers to a user himself, but generally such an operator may be the system operator utility as well. As also shown in the figure, system 100 either includes as its constructional part or is configured to be connectable to an external display utility 135.

System 100 is associated with an external imager 130 and includes a frame grabber utility 134 for receiving data indicative of video frames/images. Imager 130 may be configured for performing image acquisition and/or recording previously acquired video stream. Imager 130 may be a camera, a playback device, a computer, a memory drive, a router distributing a camera signal to multiple users, etc.

According to the invention, manager utility 120 is configured to be inputted with data indicative of a reference image of a region of interest (part of a scene) involved in the video stream, and to be inputted by a video stream on which the desired visual effects are to be presented. The output data of manager utility 120 from the user's point of view may include an operating signal for imager 130 to thereby provide said data indicative of the reference image to be displayed for the system operator. Also, the manager utility may operate to initiate the video stream transmission from the imager. Manager utility 120 communicates with processor utility 110 by producing data indicative of the user's selection of reference features in the reference image, preparation of the augmented reference image, and user's selection of reference features in the snapshot image.

The manager utility is configured to enable the operator to select and mark on the reference image a set of at least a few reference features (e.g., points), and to insert the visual effects (e.g., graphics) in the reference image so as to provide a desired orientation of these effects with respect to the region of interest within the reference image, thus producing an augmented reference image (reference image with the desirably oriented visual effects). The augmented reference image is appropriately recorded.

Also, the manager utility 120 allows the operator to select a snapshot image from a grabbed sequence of video frames, and mark at least two from said reference features set in the snapshot image. As indicated above, the snapshot image is selected so as to enable finding therein at least two of the defined set of reference features. If less than two reference features appear in the snapshot image, then another snapshot image should be selected. Alternatively, in a case where there are no two common reference features in the reference and snapshot images, different reference features are selected, or even another reference image is taken. In the latter case, a new augmented reference image would be generated.

When correspondence of the at least two reference features in the reference and snapshot images is established, the system can operate (with or without the operator's management) to augment at least some video frames from the video stream, in the above-described manner. The resulting augmented video frames may be output (by the manager utility) for operator review.

Thus, processor utility 110 is responsive to the first data coming from manager utility 120 and also responsive (directly or through the manager utility) to second data indicative of the video frames coming from imager 130. As indicated above, the first data includes data indicative of the user's selection of reference features in the reference image, the augmented reference image, and user's selection of reference features in the snapshot image. Processor 110 is pre-programmed (with the certain software model) to analyze the reference and snapshot images (with the selected reference features therein) to determine the reference transformation; and to apply pattern recognition to a sequence of grabbed video frames and determine the transformations sequence. The processor utility also operates to insert the visual effects into a certain video frame and determine the operative transformation (as the transformation between the reference image and said certain video frame); and further manage the visual effects insertion in further video frames. Upon detecting a video frame that corresponds to a completely different field of view (video frame 208 in FIG. 2), the processor utility generates a corresponding signal to the operator, thereby initiating the repetition of the snapshot selection and processing.

Those skilled in the art will readily appreciate that various modifications and changes can be applied to the embodiments of the invention as hereinbefore exemplified without departing from the scope as defined in and by the appended claims.

The invention claimed is:

1. A method for use in real-time insertion of visual effects in a video stream, the method comprising:
   i. processing at least one reference image that contains a region of interest, which is to be involved in the video stream, said processing comprising receiving user input for inserting visual effects into said at least one reference image with a desired orientation of said visual effects with respect to the region of interest to thereby form an augmented reference image, and defining a set of at least a few reference features in said at least one reference image;
   ii. grabbing successive sequence of video frames from said video stream, and processing said successive sequence to generate a corresponding augmented sequence of video frames with said visual effects appearing therein; said processing comprising:
      selecting at least one frame of said video frames, in which at least two reference features from said few reference features appear, for used as at least one snapshot image, and processing said snapshot image to establish correspondence between at least two reference features in the snapshot image and the reference image and determine a reference transformation between the snapshot image and the reference image;
      independent of said processing of the snapshot image with said at least two features, applying an independent processing to the snapshot image and to other frames of said successive sequence of the video frames and determining a sequence of transformations between the frames of said successive sequence; and
      utilizing said determined sequence of transformations and said determined reference transformation to determine an operative transformation between the reference image and either one of said frames in the successive sequence;
   thereby enabling real-time management of the appearance of the visual effects in the video stream by using said operative transformation for the insertion of the visual effects in other video frames of said successive sequence.

2. The method of claim 1, wherein said determining of the sequence of transformations between said at least some of the video frames comprises applying pattern recognition to the video frames.

3. The method of claim 2, wherein said pattern recognition utilizes estimation of a motion of background windows at a video rate.

4. The method of claim 1, wherein the video frames are grabbed using an imager configured for rotation while at a fixed position thereof with respect to the region of interest.

5. The method of claim 1, wherein said processing of said one or more snapshot images comprises selecting and marking of only two of said reference features therein.

6. The method of claim 1, wherein said set of reference features includes at least four reference features.

7. The method of claim 1, comprising selecting in at least some of the video frames at least one moving object in the region of interest, a current position of said at least one moving object determining the appearance of the visual effects in the current video frame.

8. The method of claim 1, wherein said set of the reference features in the reference image and said at least two reference features in said one or more snapshot images are selected and marked by user.

9. The method of claim 1, for use in the insertion of visual effects in real time broadcasting or in post production.

10. The method of claim 1, for use in the insertion of the visual effects and graphic advertisements, during live broadcasting or post production of a sport game.

11. The method of claim 10, wherein said sport game includes at least one of the following: soccer, basketball, volleyball, beach volleyball, handball, cricket, rugby, American football, golf, track and field sports, skiing, ice skating, hockey, badminton, curling, tennis, table tennis, biking, racing, boxing, judo, sumo, wrestling, and swimming.

12. A system for use in real-time insertion of visual effects in a video stream, the system comprising:
   (a) a frame grabber utility configured for receiving data indicative of the video stream;
   (b) a manager utility connectable to the frame grabber and configured and operable to carry out the following: receive user input with regard to certain visual effects for inserting the visual effects into at least one reference image with a desired orientation of said visual effects with respect to a region of interest in the at least one reference image, process the reference image and inserting said visual effects into said reference image with said desired orientation of said visual effects with respect to the region of interest, to thereby form an augmented reference image, and define a set of at least a few reference features in said at least one reference image; and select at least one video frame of a successive sequence of video frames in which at least two of said reference features appear, for use as at least one snapshot image;
   (c) a processor utility configured and operative to be responsive to data indicative of the successive sequence of video frames of said video stream, data indicative of the reference image with said few reference features therein, and data indicative of said at least one snapshot image with said at least two reference features therein; said processor utility being configured for processing said successive sequence of video frames and generating a corresponding augmented sequence of video frames with said visual effects appearing therein by independently carrying out a first processing of said data indicative of the video frames sequence and determining a sequence of transformations between at least some of said video frames including that of the at least one snapshot image, and a second processing of said data indicative of the reference and snapshot images and determining a reference transformation between the snapshot image and the reference image based on correspondence between at least two reference features in the reference image and snapshot image; and being configured for analyzing the determined reference transformation and the determined sequence of transformations to determine an operative transformation between the reference image and either one of said video frames in the successive sequence, and use this operative transformation for real-time management of the appearance of the visual effects in the video stream.

13. The system of claim 12, wherein said processor utility is configured and operable to perform said determining of the sequence of transformations between said at least some of the video frames by applying pattern recognition to the video frames.

14. The system of claim 13, wherein said pattern recognition comprises estimation of a motion of background windows at a video rate.

15. The system of claim 12, wherein the frame grabber is configured and operable for grabbing the video frames using an imager configured for rotation while at a fixed position thereof with respect to the region of interest.

16. The system of claim 12, wherein said processor utility is configured for processing of said one or more snapshot images by selecting and marking of only two of said reference features therein.

17. The system of claim 12, wherein said set of reference features includes at least four reference features.

18. The system of claim 12, wherein said processor utility is configured and operable for selecting in at least some of the video frames at least one moving object in the region of interest, a current position of said at least one moving object determining the appearance of the visual effects in the current video frame.

19. The system of claim 12, for use in the insertion of visual effects in real time broadcasting or in post production.

20. The system of claim 12, for use in the insertion of the visual effects and graphic advertisements, during live broadcasting or post production of a sport game.

* * * * *